(12) United States Patent
Watanabe

(10) Patent No.: US 12,207,177 B2
(45) Date of Patent: Jan. 21, 2025

(54) COMMUNICATION APPARATUS, CONTROL METHOD, AND PROGRAM

(71) Applicant: CANON KABUSHIKI KAISHA, Tokyo (JP)

(72) Inventor: Ryo Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 17/508,743

(22) Filed: Oct. 22, 2021

(65) Prior Publication Data

US 2022/0046518 A1 Feb. 10, 2022

Related U.S. Application Data

(63) Continuation of application No. PCT/JP2020/013585, filed on Mar. 26, 2020.

(30) Foreign Application Priority Data

Apr. 24, 2019 (JP) .................................. 2019-083244

(51) Int. Cl.
*H04W 48/08* (2009.01)
*H04W 48/02* (2009.01)
(Continued)

(52) U.S. Cl.
CPC .......... *H04W 48/08* (2013.01); *H04W 48/02* (2013.01); *H04W 72/0453* (2013.01); *H04W 84/20* (2013.01)

(58) Field of Classification Search
CPC . H04W 48/08; H04W 48/02; H04W 72/0453; H04W 84/20; H04W 84/12;
(Continued)

(56) References Cited

U.S. PATENT DOCUMENTS 6,286,104 B1 * 9/2001 Buhle .................. H04L 63/105
707/999.009
11,160,109 B2 * 10/2021 Yang ..................... H04L 5/0098
(Continued)

FOREIGN PATENT DOCUMENTS

JP 2016111431 A 6/2016
JP 2017163236 A 9/2017
(Continued)

OTHER PUBLICATIONS

3rd Generation Partnership Project, Technical Specification Group Radio Access Network; Study on NR-based access to unlicensed spectrum (Release 16) [online], 38PP TR 38.889 V16.0,0 Dec. 2018, URL:https://www.3gpp.org/ftp/Specs/archive/38_series/38.889/38889-g00.zip.
(Continued)

*Primary Examiner* — Brian T O Connor
(74) *Attorney, Agent, or Firm* — Canon U.S.A., Inc. IP Division

(57) ABSTRACT

When a communication is performed in a particular frequency channel included in a 6 GHz band, if a signal that is not according to the IEEE 802.11 series standard is detected in the 6 GHz band, control is performed such that a signal according to the IEEE 802.11 series standard is not allowed to be transmitted in the particular frequency channel.

19 Claims, 2 Drawing Sheets

(51) Int. Cl.
*H04W 72/0453* (2023.01)
*H04W 84/20* (2009.01)

(58) Field of Classification Search
CPC ..... H04W 16/14; H04W 76/15; H04W 28/18; H04W 28/24; H04W 72/541; H04W 72/52; H04W 36/06
See application file for complete search history.

(56) References Cited

U.S. PATENT DOCUMENTS

| | | | | |
|---|---|---|---|---|
| 11,497,033 | B2* | 11/2022 | Choi | H04W 72/232 |
| 11,497,056 | B2* | 11/2022 | Goyal | H04B 7/0695 |
| 11,737,078 | B2* | 8/2023 | Choi | H04W 72/232 |
| | | | | 370/329 |
| 11,805,551 | B2* | 10/2023 | Sun | H04W 52/245 |
| 11,843,551 | B2* | 12/2023 | Salim | H04L 5/0094 |
| 11,843,938 | B2* | 12/2023 | Karaki | H04L 1/188 |
| 2018/0295520 | A1 | 10/2018 | Garg et al. | |
| 2022/0217797 | A1* | 7/2022 | Kim | H04W 76/15 |
| 2023/0354294 | A1* | 11/2023 | Choi | H04W 72/12 |

FOREIGN PATENT DOCUMENTS

| | | |
|---|---|---|
| JP | 2017168902 A | 9/2017 |
| JP | 2017-208615 A | 11/2017 |
| JP | 2018-093289 A | 6/2018 |
| JP | 2018170654 A | 11/2018 |
| JP | 2018534799 A | 11/2018 |
| WO | 2018/232138 A1 | 12/2018 |
| WO | 2019005523 A1 | 1/2019 |

OTHER PUBLICATIONS

Shoko Shinohara et al.; System Capacity Improvement by CCA Threshold Control and Transmit Power Control with High Efficiency Wireless LAN; NTT Access Network Service System Laboratories, NTT Corporation; The Institute of Electronics, Information and Communication Engineers; IEICE Technical Report RCS2016-208 (Dec. 2016).

3GPP TR 38.889 V16.0.0 (Dec. 2018); 3rd Generation Partnership Project; Technical Specification Group Radio Access Network; Study on NR-based access to unlicensed spectrum (Release 16).

* cited by examiner

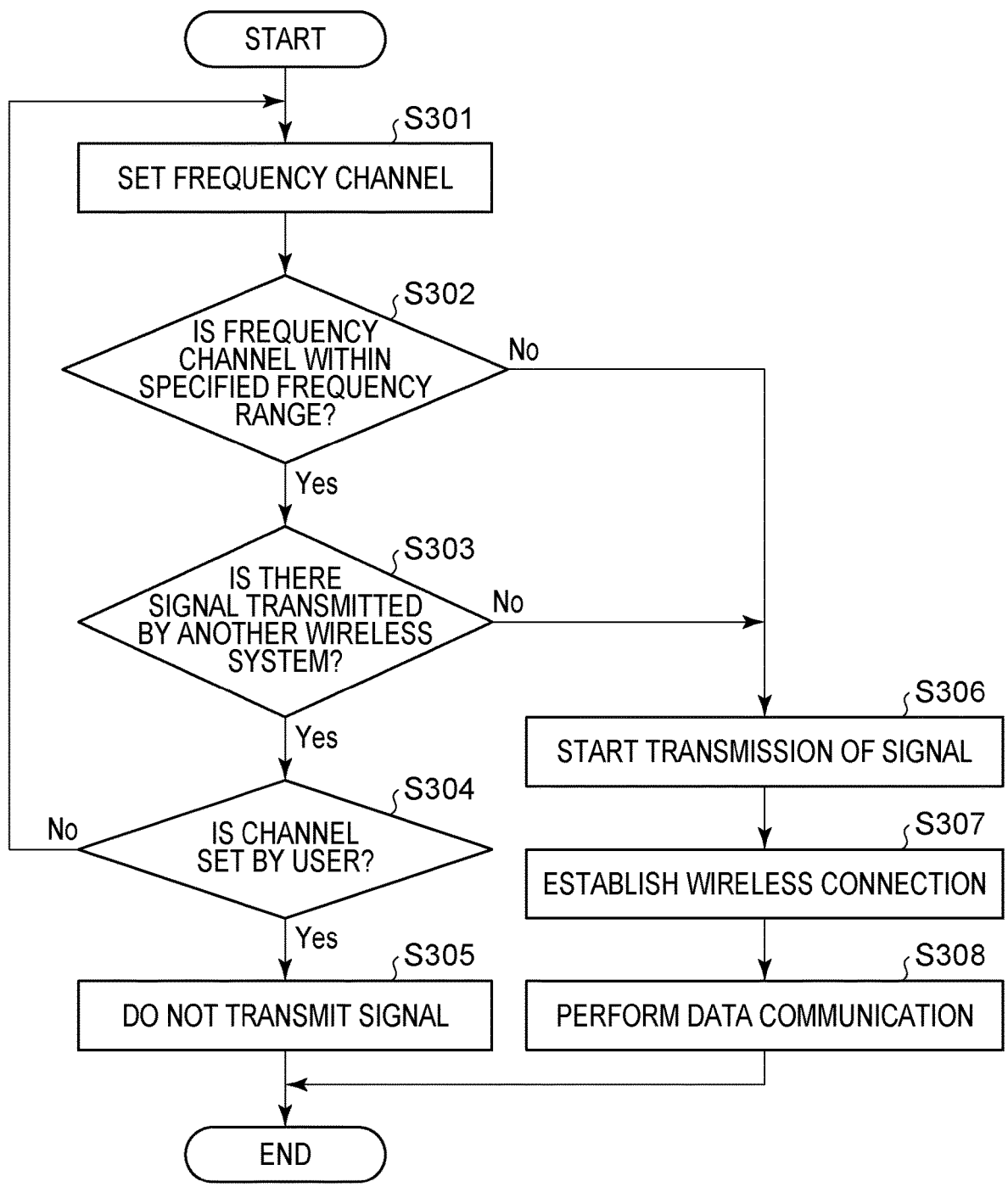

COMMUNICATION APPARATUS, CONTROL METHOD, AND PROGRAM

CROSS-REFERENCE TO RELATED APPLICATIONS

This application is a Continuation of International Patent Application No. PCT/JP2020/013585, filed Mar. 26, 2020, which claims the benefit of Japanese Patent Application No. 2019-083244, filed Apr. 24, 2019, both of which are hereby incorporated by reference herein in their entireties.

BACKGROUND

Technical Field

The present invention relates to a technique of suppressing interference in wireless communication according to the IEEE 802.11 series standard.

Description of Related Art

The IEEE (Institute of Electrical and Electronics Engineers) 802.11 series standard is known as one of the wireless communication standards. US2018/0084584 discloses a technique using the IEEE802.11ax standard that allows achievement of a high peak throughput of up to 9.6 gigabits per second (Gbps) in OFDMA and an improvement in communication speed under congested conditions are achieved. "OFDMA" is an abbreviation for Orthogonal Frequency-Division Multiple Access.

To achieve a further improvement in throughput in wireless communication, a Study Group called IEEE 802.11EHT (Extreme High Throughput) has been established. In this study group, to improve the throughput, newly allowing communication using the 6 GHz band has been under discussion.

However, since the 6 GHz band is already used by other wireless systems such as a fixed wireless communication, satellite communication, etc., use of the 6 GHz band for new communication can cause interference with these existing one or more other wireless systems.

CITATION LIST

Patent Literature

PTL 1: US2018/0084584

SUMMARY OF INVENTION

In view of the above problem, an object of the present invention is to provide a technique of reducing interference with one or more other wireless systems when the 6 GHz band is used for communication according to the IEEE 802.11 series standard.

To achieve the above object, the present invention provides a communication apparatus including first determination means configured to determine whether there exists a signal in a 6 GHz band that is not according to an IEEE (Institute of Electrical and Electronics Engineers) 802.11 series standard, and control means configured to perform control such that when the communication apparatus performs communication in a particular frequency channel included in the 6 GHz band, if the first determination means determines that there exists a signal in the 6 GHz band that is not according to the IEEE 802.11 series standard, a signal according to the IEEE 802.11 series standard is not allowed to be transmitted in the particular frequency channel.

Further features of the present invention will become apparent from the following description of exemplary embodiments with reference to the attached drawings.

BRIEF DESCRIPTION OF DRAWINGS

FIG. 3 is a flowchart of a process performed by an AP 102.

DESCRIPTION OF EMBODIMENTS

Figure 1:
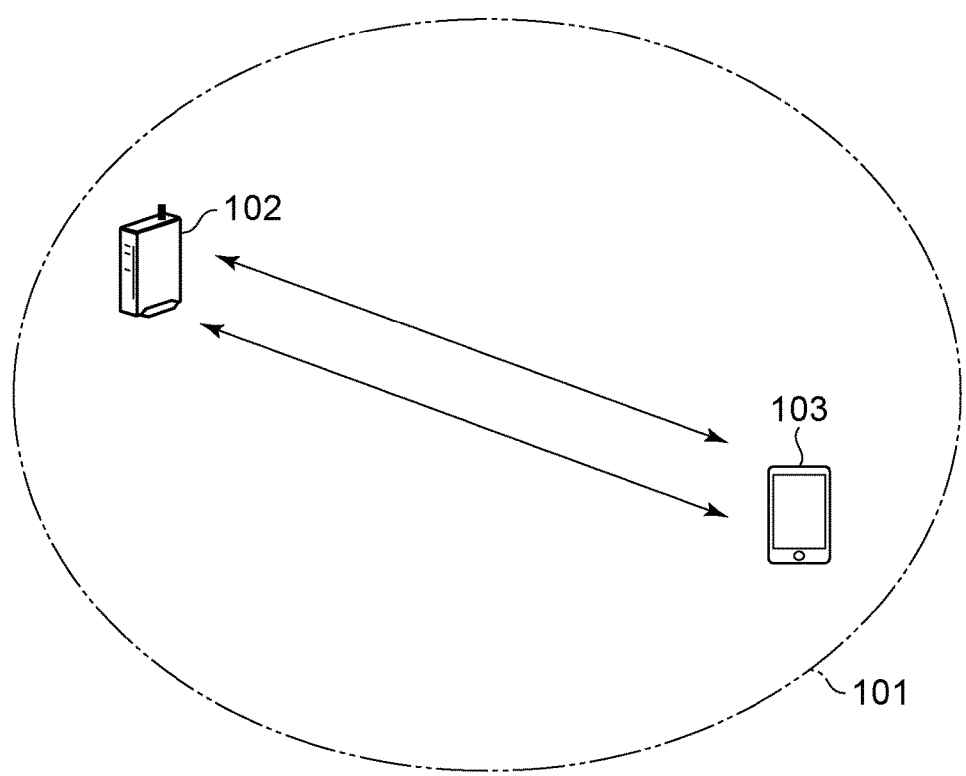
FIG. 1 is a diagram illustrating a network configuration.

FIG. 1 shows a network configuration according to an embodiment. An AP 102 denotes an access point (AP) for establishing a wireless network 101 according to the IEEE (Institute of Electrical and Electronics Engineers) 802.11be standard. Note that the IEEE802.11be standard refers to a standard established by the Study Group of IEEE802.11 EHT. Here, "EHT" is an abbreviation for Extreme High Throughput. The AP 102 is an access point according to the IEEE802.11be standard, and the AP 102 transmits and receives various wireless signals according to the IEEE802.11 series standard.

An STA 103 is a station that wirelessly connects to the AP 102 and performs communication via the wireless network 101. Note that the AP 102 is not limited to an access point, but the AP 102 may be a Group Owner according to the Wi-Fi Direct standard, and the AP 102 may be referred to as a base station. The STA 103 may be a client according to the Wi-Fi Direct standard, and may be referred to as a slave station. Hereinafter, base stations and slave stations will be collectively referred to as a communication apparatus.

Note that the network configuration described above is merely an example. For example, the network may further include many other communication apparatuses according to the EHT, legacy devices, and/or the like. Furthermore, a positional relationship between communication apparatuses is not limited to that shown in FIG. 1, and the positional relationship may vary dynamically. The legacy device refers to a communication apparatus that supports at least one of IEEE802.11a, b, g, n, ac, or ax but does not support EHT.

Figure 2:
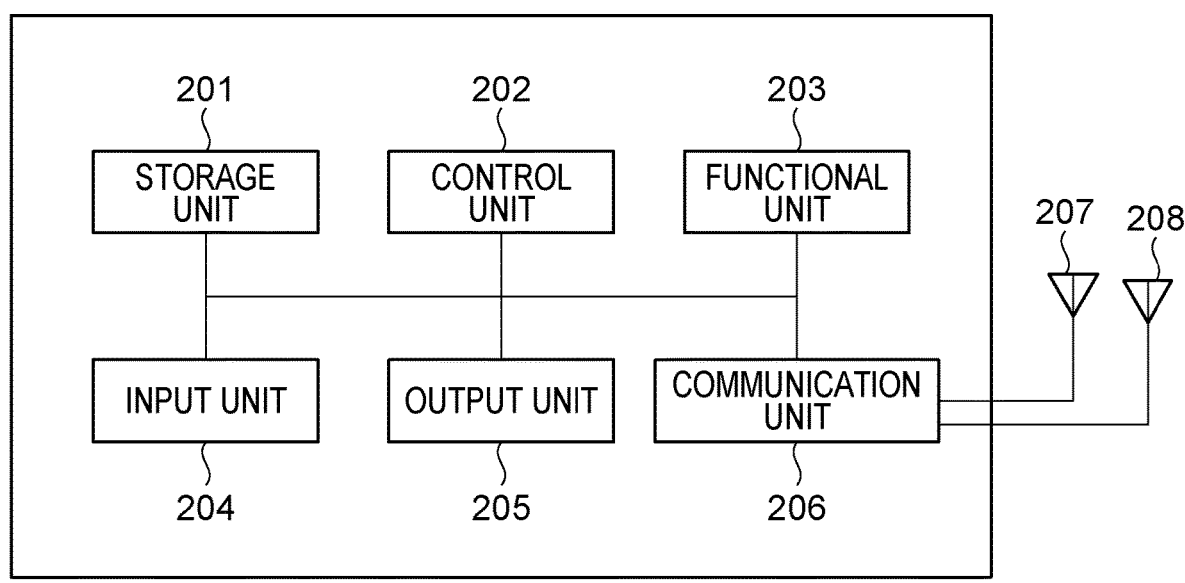
FIG. 2 is a diagram illustrating a hardware configuration of a communication apparatus.

FIG. 2 illustrates a hardware configuration of a communication apparatus (corresponding to each of the AP 102 and the STA 103) according to the present embodiment. The communication apparatus includes a storage unit 201, a control unit 202, a functional unit 203, an input unit 204, an output unit 205, a communication unit 206, and radio antennas (hereinafter, simply referred to as antennas) 207 and 208.

The storage unit 201 is realized using one or more memories such as a ROM, a RAM, etc. The storage unit 201 stores various kinds of information such as a computer program for performing various operations described later and communication parameters related to wireless communication. "ROM" is an abbreviation for Read Only Memory, and "RAM" is an abbreviation for Random Access Memory. Examples of devices usable as the storage unit 201 include, in addition to memories such as a ROM, a RAM, etc., storage media such as a flexible disk, a hard disk, an optical disk, a magneto-optical disk, a CD-ROM, a CD-R, a magnetic tape, a non-volatile memory card, a DVD.

The control unit 202 includes one or more processors such as a CPU or an MPU, and controls the entire communication apparatus by executing a computer program stored in the storage unit 201. "CPU" is an abbreviation for Central Processing Unit and "MPU" is an abbreviation for Micro Processing Unit, each of which functions as a computer. The control unit 202 may control the entire communication apparatus by cooperating with the OS and the program stored in the storage unit 201. The control unit 202 may include a plurality of processors such as a multi-core processor, and the plurality of processors may control the entire communication device. The control unit may include an ASIC (application specific integrated circuit), a DSP (digital signal processor), an FPGA (field programmable gate array), and/or the like. The control unit 202 also controls the functional unit 203 to execute a particular process such as an imaging process, a printing process, a projection process, and/or the like.

The functional unit 203 is hardware for the communication apparatus to execute a particular process. For example, in a case where the communication apparatus is a camera, the functional unit 203 may be an imaging unit which performs an imaging process. In a case where the communication apparatus is a printer, the functional unit 203 may be a printing unit which performs a printing process. In a case where the communication apparatus is a projector, the functional unit 203 may be a projection unit which performs a projection process. Data processed by the functional unit 203 may be data stored in the storage unit 201, or may be data used or acquired in communication with one or more other communication apparatuses via the communication unit 206 which will be described later. The communication apparatus may not include the functional unit 203.

The input unit 204 accepts various operations performed by a user. The output unit 205 provides various outputs to a user. Here, the outputs provided by the output unit 205 include at least one of displaying on a screen, an audio output by a speaker, or a vibration output. Note that the input unit 204 and the output unit 205 may be realized in one module such as a touch panel. Note that the communication apparatus may not include the input unit 204 and/or the output unit 205.

The communication unit 206 controls wireless communication and IP communication in accordance with the IEEE 802.11 series standard. The communication unit 206 controls the antennas 207 and 208 and transmits and receives a wireless signal in wireless communication. The communication apparatus transmits or receives a data content such as image data, document data, video data, or the like to or from another communication apparatuses via the communication unit 206. The communication apparatus is not limited to having a configuration including a plurality of antennas, and may have a configuration including only one antenna.

The antennas 207 and 208 each are an antenna capable of transmitting and receiving a radio signal in at least one of a 2.4 GHz band, a 3.6 GHz band, a 4.9 and 5 GHz band, a 6 GHz band, and a 60 GHz band, wherein there is no particular restriction on a combination of frequency bands covered by the antennas. However, at least one of the antennas 207 and 208 can transmit and receive a radio signal in the 6 GHz band. The communication apparatus may be capable of performing MIMO (Multi-Input and Multi-Output) communication using the antennas 207 and 208.

FIG. 3 shows a flowchart of a process performed by an AP 102. The process shown in this flowchart in FIG. 3 is started when the power of the AP 102 is turned on. Alternatively, this process may be started in response to an instruction to start wireless communication in the 6 GHz band issued via an operation by a user.

The process shown in the flowchart in FIG. 3 is realized by the control unit 202 by reading and executing a program stored in the storage unit 201 of the AP 102. Part or all of the steps of the flowchart shown in FIG. 3 may be performed by hardware such as ASIC. "ASIC" is an abbreviation for Application Specific Integrated Circuit.

First, the AP 102 sets a frequency channel used for communication in the 6 GHz band (S301). More specifically, a frequency channel set by a user, a frequency channel selected by the AP 102, or a default frequency channel is set in this step. When the AP 102 selects a frequency channel, for example, it may randomly select a frequency channel or select a frequency channel where there is no congestion.

One of known methods of acquiring a status of a radio channel in terms of congestion is to wait for signals according to the IEEE802.11 series standard to arrive in each frequency channel for a particular period, and determine the status based on the number of received signal or based on the total length of time during which signals are received. According to this method, a frequency channel showing a least number of occurrences of received signals or a frequency channel showing a smallest total length of time of receiving signals is selected as the frequency channel where there is no congestion. Alternatively, information on one or more frequency channels in which one or more wireless networks are established by one or more other APs may be acquired, and the status of congestion in wireless communication may be determined based on the acquired information. Information on one or more frequency channels in which one or more wireless networks are established by one or more other APs may be acquired from beacons transmitted from the one or more APs, or may be acquired by transmitting and receiving signals according to the Wi-Fi EASY MESH standard.

When information on the status of congestion in wireless channels is acquired, the AP 102 may perform control such that it is possible to detect signals transmitted by other wireless systems, and in a case where such a signal is detected, the frequency channel in which the signal is detected is excluded from the selection of the frequency channel.

Next, the AP 102 determines whether or not the selected frequency channel is included in the specified frequency range (S302). The specified frequency range refers to, for example, a range from 5.925 GHz to 6.425 GHz, a range from 6.425 GHz to 6.525 GHz, a range from 6.525 GHz to 6.875 GHz, or a range from 6.875 GHz to 7.125 GHz. Note that only part of these frequency ranges may be allowed as the specified frequency range. For example, current position information indicating a current position of the AP 102 may be acquired by GPS or the like, and a frequency range that conforms to a regulation depending on a country or a region to which the AP 102 belongs may be selected as the specified frequency range. "GPS" is an abbreviation for Global Positioning System. Note that the whole frequency range of the 6 GHz band, that is the range from 5.925 GHz to 7.125 GHz may be employed as the specified frequency range.

In a case where the selected frequency channel is not within the specified frequency range (No in S302), the process proceeds to step S306 which will be described later.

In a case where the selected frequency channel is within the specified frequency range (Yes in S302), the AP 102 determines whether or not one or more signals transmitted by one or more other wireless systems in the selected frequency channel exist or appear in a predetermined period of time (S303). Until the determination is completed, the AP 102 does not transmit a signal according to the IEEE 802.11 series standard at least in the selected frequency channel. This is to prevent a possibility of interference with one or more other wireless systems.

The one or more other wireless systems include, for example, fixed radio communication and satellite communication. Note that the one or more other wireless systems are not limited to these, but may include marine mobile communication, aeronautical mobile communication, amateur radio communication, and the like. A specific method for the AP 102 to determine whether or not there are one or more signals transmitted by one or more other wireless systems is to measure the energy in the selected frequency channel and determine whether the measured energy is greater than a predetermined threshold value. More specifically, in a case where the measured energy is greater than the predetermined threshold value, it is determined that there exist one or signals transmitted by one or more other wireless systems. However, in a case where the measured energy is not greater than the predetermined threshold value, it is determined that there exist no signals transmitted by one or more other wireless systems.

Note that the AP 102 can identify signals according to the IEEE 802.11 series standard. Therefore, during a period in which the AP 102 is receiving a signal according to the IEEE802.11 series standard, the AP 102 excludes the energy of the signal according to the IEEE802.11 series standard from the determination, or the AP 101 does not perform the determination when the signal according to the IEEE802.11 series standard is being received, thereby making it possible for the AP 101 to correctly determine whether or not there exist one or more signals transmitted by one or more other wireless systems.

In a case where it is determined that there exist one or more signals transmitted by one or more other wireless systems (Yes in S303), the AP 102 determines whether the frequency channel selected in step S301 is a channel selected by a user (S304). In a case where the channel is not selected by the user (No in S304), the process returns to step S301, and the AP 102 reselects a frequency channel to be set. In this case, a frequency channel that is determined to have one or more signals transmitted by one or more other wireless systems is excluded from candidates for a frequency channel to be selected. The process may immediately return to step S301, or may return to step S301 after waiting for a predetermined time to elapse. In a case where the process waits for the predetermined time to elapse, a frequency channel determined to have one or more signals transmitted by one or more other wireless systems may not be excluded from the candidates. This is because surrounding radio conditions may change with the passage of time, and thus, as a result of a change in the conditions, it becomes possible to perform communication in such a frequency channel.

In a case where the channel is a channel selected by a user (Yes in S304), the AP 102 ends the process shown in FIG. 3 without transmitting a signal according to the IEEE802.11 series standard (S305). In this case, a notification may be given to a user to notify that one ore more signals of one or more other wireless systems are detected and thus it is not allowed to perform communication according to the IEEE802.11 series standard, that is, Wi-Fi communication. Alternatively, after a predetermined time has elapsed, the process may return to step S301 and the AP 102 may restart the process. In this case, it is not necessary to exclude a frequency channel determined to have one or more signals transmitted by one or more other wireless systems from the candidates for the frequency channel to be selected. This is because when the predetermined time has elapsed, surrounding radio conditions may have changed.

Even in a case where the channel is a channel selected by a user, the process may return to step S301, and the AP 102 may reselect a frequency channel to be set. For example, in a case where a user has specified in advance a frequency channel that is to be used when there exist one or more signals transmitted by one or more other wireless systems, the process may return to step S301. In a case where the operation is in a mode in which when there exist one or more signals of transmitted by one or more other wireless systems, the frequency channel is automatically changed, the process may return to step S301. After the process returns to step S301, a user may newly select a frequency channel different from the frequency channel in which there exist one or more signals of one or more other wireless systems.

The process may return to step S301 without performing the determination in step S304. In a case where the process returns to step S301 in this manner, the frequency channel determined to have one or more signals transmitted by one or more other wireless systems is excluded from the candidates for the frequency channel to be selected. The process may immediately return to step S301, or may return to step S301 after waiting for a predetermined time to elapse. In a case where the process waits for the predetermined time to elapse, a frequency channel determined to have one or more signals transmitted by one or more other wireless systems may not be excluded from the candidates.

Next, a description is given below for a case where it is determined that there exist no signals transmitted by one or more other wireless systems (No in S303). In this case, the AP 102 starts transmitting a signal according to the IEEE802.11 series standard in the selected frequency channel, and establishes a wireless network 101 (S306). The signal transmitted here is, for example, a Beacon frame according to the IEEE 802.11 series standard. The Beacon frame includes an SSID which is identification information of the wireless network 101 and information on the selected frequency channel (the operating channel), and is transmitted every cycle (for example, every 100 milliseconds) defined by a Beacon Interval. Information on the frequency channel is included, as an element of a DSSS Parameter Set, in the Beacon frame. "SSID" is an abbreviation for Service Set IDentifier. "DSSS" is an abbreviation for Direct Sequence Spread Spectrum. However, the manner of providing the frequency channel information is not limited to these examples. For example, it may be included as another element in a Beacon frame, or may be included in another frame (Probe Response, etc.) other than the Beacon frame.

The AP 102 also transmits signals such as Probe Response, Association Response, and Reassociation Response frames according to the IEEE 802.11 series standard in the frequency channel. For example, when a Probe Request frame functioning as a search signal according to the IEEE 802.11 series standard is received from the STA 103, the AP 102 transmits a Probe Response frame as a search response signal. In a case where an Association Request frame functioning as a connection request signal according to the IEEE 802.11 series standard is received from the STA 103, the AP 102 transmits an Association Response frame as a connection response signal. The wireless connection between the AP 102 and the STA 103 is established in the above-described manner (S307), and it becomes possible to perform wireless communication via the wireless network 101.

When secure communication using encryption is performed between the AP 102 and the STA 103, processing such as WPA (Wi-Fi Protected Access), WPA2, WPA3 may be further performed. After the wireless connection is established in the above-described manner, data communication is performed between the AP 102 and the STA 103 by transmitting and receiving signals according to the IEEE 802.11 series standard via the 6 GHz band wireless network 101 (S308). Since legacy devices do not perform transmission/reception of signals according to the IEEE802.11 series standard in the 6 GHz band, signals according to the IEEE802.11be or later standard are used.

As described above, the AP 102 can start communication according to the IEEE 802.11 series standard while preventing interference with other wireless systems that use the 6 GHz band. When one or more signals of one or more other wireless systems using the 6 GHz band are detected, a notification of this fact may be given to a user. This provides an improved convenience to a user.

When the AP 102 performs communication in the 6 GHz band, a plurality of frequency channels may be used. In this case, the AP 102 confirms that part or all of the plurality of frequency channels are within the specified frequency range. The AP 102 then determines whether or not one or more signals transmitted by one or more other wireless systems appear or exist in one or more frequency channels included in the specified frequency range in a predetermined period of time. Thus, also in the case where a plurality of frequency channels in the 6 GHz band are used, it is possible to start communication according to the IEEE 802.11 series standard while preventing interference with one or more other wireless systems.

In addition to a communication using the 6 GHz band (hereinafter referred to as the first communication), the AP 102 may perform a communication using the 2.4 GHz band or the 5 GHz band (hereinafter referred to as the second communication) in parallel to the first communication in the 6 GHz band. That is, the AP 102 may establish one or more other wireless networks using the 2.4 GHz band or the 5 GHz band in addition to the 6 GHz band wireless network 101.

In this case, when the frequency channel selected in step S301 is within the specified frequency range, the AP 102 performs control such that a frequency channel in a band different from W53 and W56 in the 5 GHz band is used for the second communication. That is, control is performed such that the second communication is performed using a frequency channel in a band different from a band that needs DFS (Dynamic Frequency Selection) for determining whether or not there is a radar signal in the 5 GHz band. This makes it possible for the AP 102 to start the second communication using the 2.4 GHz band or the like when the AP 102 is performing the determination, before starting the first communication in the 6 GHz band, as to whether or not there are one or more signals in the 6 GHz band transmitted by one or more other wireless systems. Thus, it is possible to start communication with the STA 103 according to the IEEE 802.11 series standard at an early stage, which provides improved convenience to a user.

In a case where the AP 102 and the STA 103 perform the second communication using the 2.4 GHz band or the 5 GHz band in parallel to the first communication in the 6 GHz band, the communication method in each frequency band may be dynamically changed. For example, the AP 102 first establishes a wireless connection with the STA 103 for the second communication using the 2.4 GHz band or 5 GHz band before a wireless connection for the first communication is established, and the AP 102 performs uplink and downlink communications using this established wireless connection for the second communication. Here, the uplink communication refers to communication for transmitting data from the STA 103 to the AP 102, and the downlink communication refers to communication for transmitting data from the AP 102 to the STA 103. When the wireless connection for the first communication between the AP 102 and the STA 103 is then successfully established in the 6 GHz band, for example, the wireless connection for the first communication in the 6 GHz band may be used exclusively for the downlink communication, and the wireless connection for the second communication may be used exclusively for the uplink communication. Alternatively, the wireless connection for the first communication in the 6 GHz band may be used exclusively for the uplink communication, and the wireless connection for the second communication may be used exclusively for the downlink communication. As described above, by dynamically changing the communication method in each frequency band, it is possible to effectively use a plurality of frequency bands while preventing interference with one or more other wireless systems in the 6 GHz band.

When the second communication using the 2.4 GHz band or the 5 GHz band is performed before the first communication is started in the above-described manner, the AP 102 transmits a beacon in the 2.4 GHz band or the 5 GHz band. In this case, after it is determined that there are no signals transmitted by one or more other wireless systems in the 6 GHz band, information indicating that a wireless network in the 6 GHz has been established or information indicating that communication in the 6 GHz band is possible may be incorporated into the beacon. In addition to or instead of the above-described information, the beacon may include information about a frequency channel determined to have no signals of one or more other wireless systems. Note that this information is not included in the beacon until it is determined that there are no signals of one or more other wireless systems in the 6 GHz band.

This makes it possible for the AP 102 to share, at an appropriate timing, an available frequency channel in the 6 GHz band with the STA which is communicating in the 2.4 GHz band or the like.

Note that the AP 102 may perform the second communication using a W53 or W56 frequency channel in the 5 GHz band. In this case, the AP 102 performs a determination process according to DFS to determine whether or not there is a radar signal in the 5 GHz band in parallel with the determination process for determining whether or not there are one or more signals transmitted by one or more other wireless systems in the 6 GHz band in step S303. This makes it possible to start communication with the STA 103 according to the IEEE 802.11 series standard more quickly than the case where the determination for determining whether or not there are one or more signals transmitted by one or more other wireless systems in the 6 GHz band is performed and then the DFS processing is performed in series.

After data communication is started in step S308, the AP 102 may perform a process similar to that in step S303 continuously or periodically. In this case, the AP 102 is allowed to transmit a beacon frame or the like or perform data communication until one or more signals transmitted by one or more other wireless systems are detected. When it is determined that there are one or more signals transmitted by one or more other wireless systems are detected, the AP 102 stops transmitting the signal according to the IEEE 802.11 series standard. In this case, the AP 102 may notify the connected STA 103 that transmission of the signal according to the IEEE802.11 series standard is to be stopped, and then may stop the transmission of the signal. In a case where a determination has already been made as to the frequency channel that is to be used when existence of one or more signals transmitted by one or more other wireless systems is detected, information about the frequency channel that is to be newly used may be included in the above-described notification. This makes it possible for the STA 103 to know which frequency channel can be used to continue the communication with the AP 102, which shortens a time during which the communication is disconnected. This results in an improvement in convenience for a user. When existence of one or more signals transmitted by one or more other wireless systems is detected, a notification may be sent to a user to notify that the existence of the one or more signals transmitted by one or more other wireless systems is detected or notify that the communication is going to be stopped. This also results in an improvement in convenience for the user. When the frequency channel used for data communication is outside the specified frequency range (No in S302), the AP 102 does not need to perform a process similar to that in step S303 after the data communication is started.

In a case where the AP 102 performs a process similar to that in S303 periodically or continuously after data communication is started, the processes in steps S302 and S303 may be omitted, and the process may proceed from step S301 to S306. That is, the AP 102 may start transmitting a signal according to the IEEE 802.11 series standard without determining whether or not there exist one or more signals transmitted by one or more other wireless systems before the signal transmission is started. This allows the AP 102 to start data communication with the STA 103 more quickly, which results in an improvement in the convenience for a user. Even in a case where the determination, before the start of the transmission in the 6 GHz, is omitted as to whether or not there are one or more signals transmitted by one or more other wireless systems, the AP 102 performs DFS before signal transmission in the 5 GHz band is started. Also in this case, it is possible to flexibly perform communication while reducing interference with one or more other wireless systems.

When the AP 102 is performing, in addition to the first communication in the 6 GHz band with the STA 103, the second communication with the STA 103 using the 2.4 GHz band or the 5 GHz band in parallel to the first communication in the 6 GHz band, a determination may be performed as to whether or not there exist one or more signals transmitted by one or more other wireless systems. In this case, when the existence of one or more signals transmitted by one or more other wireless systems in the 6 GHz band is detected, the first communication in the 6 GHz band is stopped, while the second communication in the 2.4 GHz band, the 5 GHz band, or the like is continued. In a case where when the wireless connection for the first communication in the 6 GHz band is used exclusively for downlink communication and the wireless connection for the second communication is used exclusively for uplink communication, if the existence of one or more signals transmitted by one or more other wireless systems in the 6 GHz band is detected, the first communication is stopped. Then, control may be performed such that the uplink communication and the downlink communication are performed using the wireless connection for the second communication.

When the AP 102 and the STA 103 are communicating with each other using such a plurality of frequency bands, there is a possibility that, in addition to detection of one or more signals transmitted by one or more other wireless systems in the 6 GHz band, a radar signal in the 5 GHz is detected by DFS. This can occur for example, when the second communication is being performed using W53 or W56 in the 5 GHz band. In such a situation, when existence of one or more signals transmitted by one or more other wireless systems the 6 GHz band or 5 GHz band is detected, a notification may be given to a user to notify that the communication speed will decrease due to the influence of the one or more other wireless systems. In this case, the same notification may be given to the user regardless of whether one or more signals transmitted by one or more other wireless systems is detected in the 6 GHz band or a radar signal in the 5 GHz band is detected by DFS. When one or more signals of one or more other wireless systems is detected in the 6 GHz band or the 5 GHz band in the determination, the AP 102 may notify the STA 103 of this fact. In this case, the notification given to the STA 103 is described such that the STA 103 can understand whether the one or more signals transmitted by the one or more other wireless systems are detected in the 6 GHz band or in the 5 GHz band. This makes it possible for the STA 103 to stop communication of the correct frequency band even when the STA 103 is communicating with the AP 102 using a plurality of frequency bands.

In the embodiments described above, it is assumed by way of example that the AP 102 performs the process shown in the flowchart in FIG. 3. However, the present invention is not limited to this, but the STA 103 may perform the process shown in the flowchart in FIG. 3. In this case, in step S301, the STA 103 sets a frequency channel in which the wireless network 101 is to be established for connection with the AP 102. The STA 103 may store the frequency channel of the wireless network 101 in advance, or may acquire the frequency channel of the wireless network 101 by scanning all channels. In the latter case, to prevent interference with one or more other wireless systems, it is desirable that passive scanning is used in which the STA 103 waits for a beacon frame from the AP 102 to be received. In the passive scanning, the STA 103 does not transmit Probe Request frames, etc., according to the IEEE 802.11 series standard.

In step S306, the STA 103 does not perform the transmission of the Beacon frame, but starts transmitting a search signal. In step S307, connection with the AP 102 is achieved via a process of transmitting a connection request signal and receiving a response signal thereof. The STA 103 may incorporate the frequency channel information as an element of the DSSS Parameter Set into a search signal (Probe Request frame) or a connection request signal (Association Request frame).

As described above, in a situation after the AP 102 and STA 103 are wirelessly connected, it is possible to flexibly preform communication while reducing interference with other wireless systems.

The present invention may be implemented by providing a program for realizing one or more functions of the above-described embodiments to a system or apparatus via a network or a storage medium, and executing the program by one or more processors in a computer of the system or apparatus. The present invention can also be realized by a circuit (for example, an ASIC circuit) for realizing one or more functions.

The present invention is not limited to the above-described embodiments, but various changes and modifications can be made without departing from the spirit and scope of the present invention. Therefore, the following Claims are appended to make the scope of the present invention public.

According to the present invention, when communication is performed according to the IEEE 802.11 series standard in the 6 GHz band, it is possible to reduce interference with one or more other wireless systems.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
one or more processors;
one or more memories storing instructions that when executed by the one or more processors cause the communication apparatus to perform operations comprising:
setting a first frequency channel as a channel to be used for communication according to an Institute of Electrical and Electronics Engineers (IEEE) 802.11 series standard;
in a case where the first frequency channel is not included in a frequency range that is part of a 6 GHz band, proceeding with steps for using the first frequency channel in communication according to the IEEE 802.11 series standard; and
in a case where the first frequency channel is included in a frequency range that is part of the 6 GHz band,
(i) monitoring the first frequency channel to determine, by a first determining, whether a signal that is not a signal according to the IEEE 802.11 series standard is transmitted in the first frequency channel; and
(ii) performing control such that, with respect to communication in the first frequency channel, where the first determining determines that a signal not according to the IEEE 802.11 series standard is being transmitted in the first frequency channel, the communication apparatus does not allow signals according to the IEEE 802.11 series standard to be transmitted in the first frequency channel.

2. The communication apparatus according to claim 1, wherein the operations further comprise, in a case where the first determining determines that no signal that is not a signal according to the IEEE802.11 series standard is being transmitted in the first frequency channel during a predetermined period of time, transmitting a signal according to an IEEE802.11be standard in the first frequency channel.

3. The communication apparatus according to claim 2, wherein in a case where the first determining determines that a signal that is not according to the IEEE802.11 series standard is transmitted in the first frequency channel during the predetermined period of time, not transmitting a signal according to the IEEE802.11be standard in the first frequency channel and instead transmitting a signal according to the IEEE802.11be standard in a second frequency channel, the second frequency channel being different from the first frequency channel.

4. The communication apparatus according to claim 1, wherein the first determining is used to determine, for each of a plurality of frequency channels in the 6 GHz band, whether a signal that is not according to the IEEE 802.11 series standard is transmitted in the each frequency channel during the predetermined time period.

5. The communication apparatus according to claim 1, wherein when the communication apparatus starts to perform communication according to the IEEE 802.11 series standard, the communication apparatus executes the first determining.

6. The communication apparatus according to claim 1, wherein when the communication apparatus is performing communication according to the IEEE 802.11 series standard, the first determining determines whether a signal is being transmitted in the first communication channel that is not according to the IEEE 802.11 series standard.

7. The communication apparatus according to claim 1, wherein the 6 GHz band is a frequency band from 5.925 GHz to 7.125 GHz.

8. The communication apparatus according to claim 1, wherein the operations further comprise acquiring location information indicating a location of the communication apparatus, and selecting, based on the acquired location information, whether or not to perform the determining by the first determining.

9. The communication apparatus according to claim 1, wherein a signal that is not according to the IEEE 802.11 series standard includes a signal for fixed radio communication or satellite communication.

10. The communication apparatus according to claim 1, wherein the operations further comprise determining, by a second determining, whether a signal that is not according to the IEEE 802.11 series standard is being transmitted in a 5 GHz band.

11. The communication apparatus according to claim 10, wherein a determination process by the first determining and a determination process by the second determining are performed in parallel.

12. The communication apparatus according to claim 1, wherein the operations further comprise, when the first determining determines that a signal that is not according to the IEEE 802.11 series standard is being transmitted in the first frequency channel, providing a particular notification to a user.

13. The communication apparatus according to claim 1, wherein the operations further comprise, when the communication apparatus is communicating with another communication apparatus, where the first determining determines that a signal that is not according to the IEEE 802.11 series standard is being transmitted in the first frequency channel, providing a particular notification to the other communication apparatus.

14. The communication apparatus according to claim 1, wherein the communication apparatus is a base station configured to establish a wireless network according to the IEEE 802.11 series standard.

15. The communication apparatus according to claim 1, wherein the communication apparatus is a slave station configured to wirelessly connect to a base station that is configured to establish a wireless network according to the IEEE 802.11 series standard.

16. A control method for controlling a communication apparatus, comprising:
setting a first frequency channel as a channel to be used for communication according to an Institute of Electrical and Electronics Engineers (IEEE) 802.11 series standard;
in a case where the first frequency channel is not included in a frequency range that is part of a 6 GHz band, proceeding with steps for using the first frequency channel in communication according to the IEEE 802.11 series standard; and
in a case where the first frequency channel is included in a frequency range that is part of the 6 GHz band, (i) monitoring the first frequency channel to determine, by a first determining, whether a signal that is not a signal according to the IEEE 802.11 series standard is transmitted in the first frequency channel; and (ii) performing control such that, with respect to communication in the first frequency channel, where the first determining determines that a signal not according to the IEEE 802.11 series standard is being transmitted in the first frequency channel, the communication apparatus does not allow signals according to the IEEE 802.11 series standard to be transmitted in the first frequency channel.

17. A non-transitory computer readable storage medium storing instructions for causing a computing device to operate as the communication apparatus according to claim 1.

18. A communication apparatus comprising:
circuitry that performs operations comprising:
setting a first frequency channel as a channel to be used for communication according to an Institute of Electrical and Electronics Engineers (IEEE) 802.11 series standard;
in a case where the first frequency channel is not included in a frequency range that is part of a 6 GHz band, proceeding with steps for using the first frequency channel in communication according to the IEEE 802.11 series standard; and
in a case where the first frequency channel is included in a frequency range that is part of the 6 GHz band, (i) monitoring the first frequency channel to determine, by a first determining, whether a signal that is not a signal according to the IEEE 802.11 series standard is transmitted in the first frequency channel; and (ii) performing control such that, with respect to communication in the first frequency channel, where the first determining determines that a signal not according to the IEEE 802.11 series standard is being transmitted in the first frequency channel, the communication apparatus does not allow signals according to the IEEE 802.11 series standard to be transmitted in the first frequency channel.

19. The communication apparatus according to claim 1, wherein control is performed such that with respect to communication in the first frequency channel, where the first determining determines that a signal not according to the IEEE 802.11 series standard is being transmitted in the first frequency channel, the communication apparatus does not allow signals according to the IEEE 802.11 series standard is to be transmitted in the first frequency channel until at least a later first determining determines that no signal that is according to the IEEE 802.11 series standard is being transmitted in the first frequency channel.

* * * * *